United States Patent Office 2,762,709
Patented Sept. 11, 1956

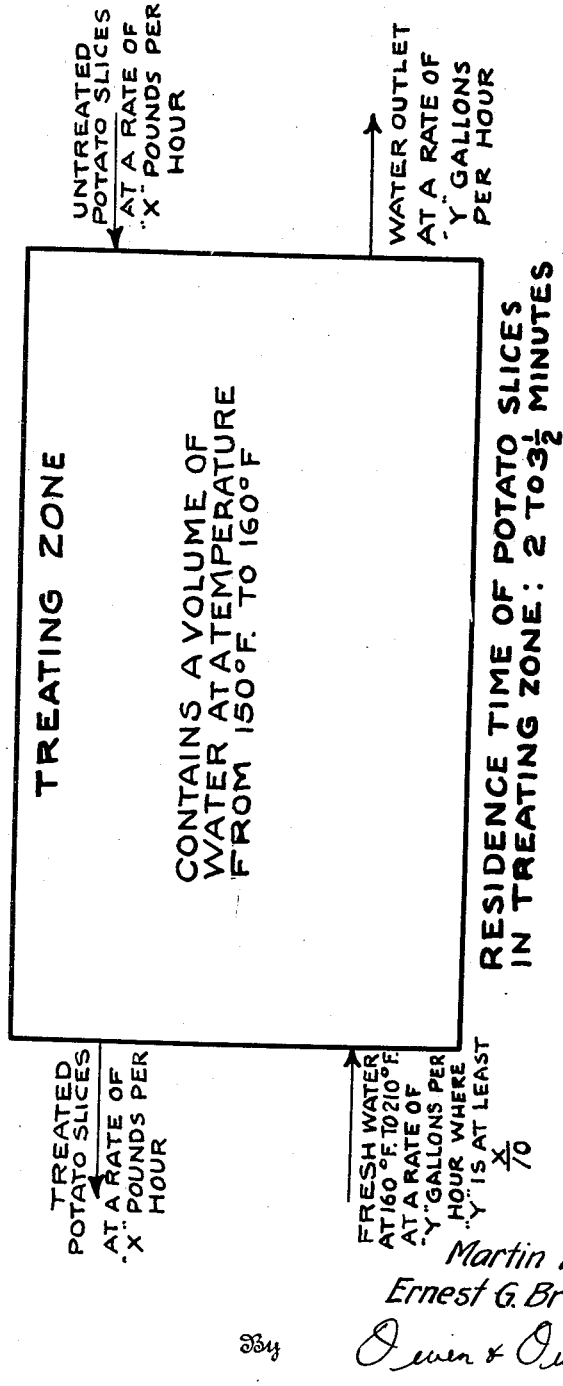

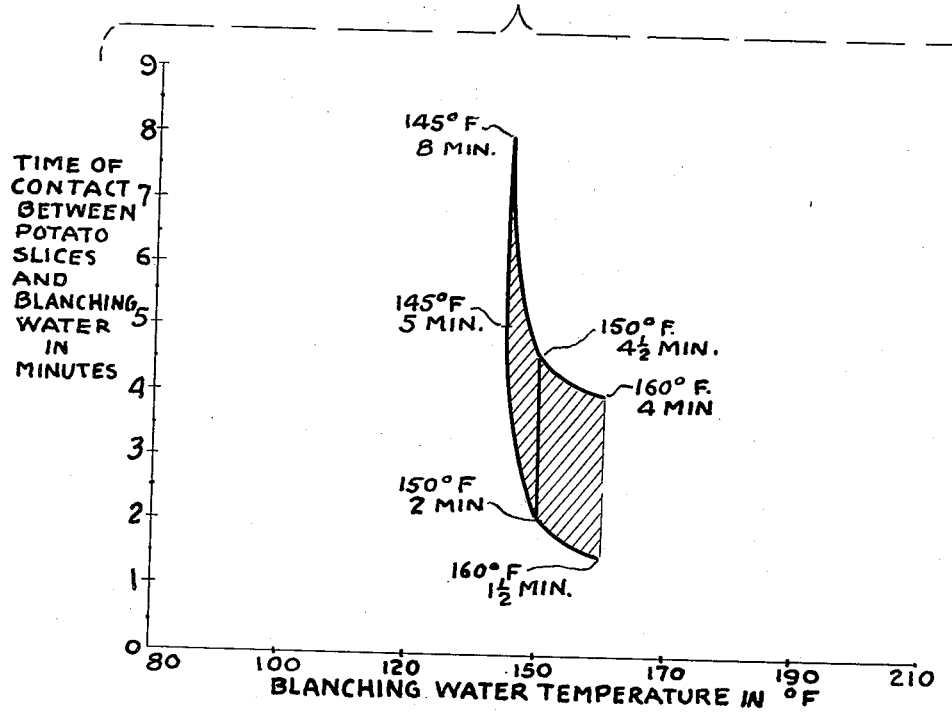

2,762,709

TREATING METHOD FOR POTATOES

Martin A. Janis, Maumee, and Ernest G. Bremforder, Toledo, Ohio, assignors to Kuehmann Foods, Inc., Toledo, Ohio, a corporation of Ohio Application May 19, 1953, Serial No. 356,062

6 Claims. (Cl. 99—100)

This invention relates to a treating method for potatoes and, more particularly, to a method especially suited for the treatment prior to frying of potatoes to prevent or minimize caramelizing during frying.

The problem of discoloration of potatoes in the course of deep fat frying has been encountered for a considerable period of time, and numerous attempts have been made to avoid this difficulty.

During storage of potatoes a chemical or enzymatic reaction occurs in the course of which starch in potatoes is converted to reducing sugars. Potatoes stored at extremely low temperatures, for example near 40° F., show a gradual increase in reducing sugar content. Accordingly, potatoes stored at such low temperatures for considerable periods of time have a substantial reducing sugar content. It has been demonstrated that such reducing sugar "caramelizes" when the potatoes are fried, and that such caramelizing is responsible for a relatively dark brown color in potatoes. Such dark brown or "caramelized" cooked potato products have a taste that has been considered unpleasant by consumers of potato products. Furthermore, the industries that supply deep fat fried potato products such as potato chips, julienne potatoes, and the like, have built trade acceptance on a light golden-brown color. Accordingly, consumers and distributors refuse deep fat fried potato products having the dark brown color characteristic of caramelization solely because of the color, and quite apart from any objectionable taste.

If potatoes are stored at only a moderately low temperature, in such manner that air is free to circulate around the potatoes, and under controlled humidity conditions, the reducing sugar content of potatoes can be lowered somewhat. Apparently, under such conditions, sugar is consumed in the potatoes by enzymatic or metabollic reactions at a rate faster than it is produced by chemical or enzymatic reactions. Accordingly, potato chip manufacturers, for example, have developed the practice of careful storage of potato stocks to control the sugar content therein. Such procedure is usually satisfactory, and enables manufacturers to produce and market potato chips and similar products of a uniform golden-brown color. However, with potatoes of some types such aging techniques are relatively unsaisfactory, and, when a manufacturer's supply of cured potatoes is exhausted it is sometimes necessary for him to replace his raw potato stocks from the open market. Frequently, potatoes available on the open market have been stored at extremely low temperatures with the result that the sugar content thereof is so high that it is impractical or impossible, by subsequent curing, to produce uncaramelized, deep fat fried potato products. For example, during times of potato shortages various manufacturers have found themselves confronted with the choice of closing their plants or using potatoes having such a high content of reducing sugar that only caramelized deep fat fried products can be produced.

In addition to the curing processes discussed above, various attempts have been made to control the reducing sugar content of potatoes by different manipulative operations. For example, the use of a hot alkaline earth salt solution has been suggested as a leaching bath for removing reducing sugars from potatoes; the claim is made for the use of such bath that it removes the sugars without any deleterious effect upon the taste of the finished product, but this claim has not been substantiated in practice. In addition, the use of dilute solutions of such acids as hydrochloric, acetic, lactic, and others, sodium bisulphite solutions and similar leaching baths have also been suggested. However, although highly satisfactory results from the standpoint of color control of the finished product have been achieved, none of the processes heretofore suggested, so far as is known, has had any commercial acceptance because each of such processes imparts a noticeable and undesirable taste to fried potatoes, particularly to deep fat fried potatoes.

Attempts to remove reducing sugars from potatoes with hot water, alone, have also been reported. For example, U. S. Patent 2,418,519 suggests a blanching tank in which water is heated by steam coils, and through which, beneath the water level, potato slices are moved on a conveyor. A pump is provided to withdraw heated water from one end of the blanching tank and to supply this water to the other end thereof and thereby to cause a flow of water in the tank in the direction of potato slice movement therethrough. We have experimented with a treating process substantially identical with that suggested by this patent, and also with one where fresh water was continuously admixed with the blanching water and the temperature maintained by steam coils positioned in the blanching water, and have found that caramelization upon deep fat frying may be substantially decreased by treating potato slices in either of these ways; however, such processes are without commercial application because the potato slices, after deep fat frying, have an "off" or "fishy" taste which renders them unsalable.

Similarly, U. S. Patent 2,448,152 reports attempts to control caramelization upon deep fat frying by treatment of potato slices with "plain hot water." The patent states (column 3, lines 31 et seq.):

"These resulted in removing some of the browning reactants but also resulted in dissolving out a portion of the pectic substances with a resulting destruction of flavor. A lower temperature with plain water had no apparent result on removal of the browning reactants and an increase in time and temperature resulted in 'cooked' taste which was not desirable in the resulting chips."

This report seems to indicate that tests consisting of treatment for an undisclosed time in water at three unstated temperatures of potato slices failed to develop a satisfactory hot water treatment for potato slices.

Further, an article by Whiteman in Potato Chipper, vol. 11, No. 3, October 1951, pages 24, 26, 28, 30 and 32, reports work on hot water treatment of potato slices. The experimental procedure employed is summarized on page 28, column 1, lines 18, et seq., as follows:

"Table 1 shows that potato slices soaked for 1 minute in tap water at 145° F. produced chips of a better color than those washed for a few seconds in tap water at 50° to 60°. The hot water treatment is used commercially to some extent."

By reference to Table 1 it is ascertained that in only one of the tests did such treatment of potato slices for one minute in water at a temperature of 145° F. result in a product that could be deep fat fried to an acceptable color.

The only suggestion in any of these three specifically identified references of a commercial process for subjecting potato slices to a hot water treatment is that from Patent 2,418,519, which is not satisfactory because of the "off" or "fishy" taste, after frying, which results therefrom.

So far as is known, no suggested way of removing reducing sugars which undergo the described caramelizing in the course of deep fat frying (aside from the curing processes on the whole, unpeeled, potatoes) has heretofore been commercially acceptable. Therefore, in order to produce marketable foodstuffs manufacturers of deep fat fried potato products have been required to arrange, in some way, that the raw potatoes, prior to peeling, have a sugar content within the range in which caramelizing does not occur. If a given supply of potatoes had an excess of sugar which could not be removed by the described curing process, manufacturers have been unable to produce satisfactory products from that supply.

The present invention is based upon the discovery of a novel way for removing reducing sugars from potatoes, according to a process that has no deleterious effect upon the taste of foodstuffs made from such potatoes.

It is therefore an object of the invention to provide a method for treating potatoes to lower the reducing sugar content thereof to a point where deep fat frying is possible without objectionable caramelizing, and whereby no undesirable taste is imparted to the potatoes.

Other objects and advantages will be apparent from the description which follows, and from the attached drawings, in which:

Fig. 1 is a schematic flow diagram representing preferred conditions for practicing the novel method of the invention; and Fig. 2 is a plot showing time-temperature relationships for satisfactory treatment of potatoes according to the invention.

According to the invention a method for treating potato slices to prevent caramelizing during subsequent deep fat frying is provided. The method of the invention comprises passing potato slices through and from a treating zone containing hot blanching water at a temperature from about 145° F. to about 160° F. at a rate such that the time of contact between the slices and the blanching water is for from about 1½ minutes to about 8 minutes. Fresh hot water is admixed with the blanching water at a rate of at least 1/10 gallon per hour per pound of potato slices passed through the treating zone which rate is sufficient to maintain the latter at a temperature such that this temperature and the time of contact between the slices and the blanching water are represented by a point within the shaded portion of Fig. 2 of the drawings. Blanching water tailings are withdrawn from the treating zone at approximately the rate that fresh water is added thereto.

Certain experimentally observed facts suggest a theoretical explanation as to why the method of the invention is effective for preventing or minimizing caramelization upon subsequent deep fat frying of potato slices but avoids the "off" or cooked taste heretofore encountered. These facts and the theoretical explanation are here presented solely for the purpose of further illustrating and disclosing the invention, and are in no way to be construed as limitations thereupon.

It has been observed that blanching of potato slices can be accomplished in water heated by steam coils substantially as disclosed in U. S. Patent 2,418,519, but that the blanched potato slices, after deep fat frying, have an "off" or fishy taste, as previously discussed. The discovery of the method of the invention suggests that the "off" or fishy taste is attributable to chemical or enzymatic reaction involving ingredients leached from the potato slices, which reaction occurs at the temperature of the steam coils. Accordingly, the method of the invention avoids such "off" or fishy taste by admixing fresh hot water, preferably continuously, with the blanching water and withdrawing blanching water tailings at approximately the rate that fresh water is so admixed. Such admixture of fresh hot water is believed to avoid the "off" or fishy taste by eliminating the need for steam coils around which such chemical or enzymatic reaction as aforesaid seems to occur. Thus for example, when blanching water was maintained at about 153° F. by admixing therewith fresh hot water at a temperature of about 200° F. and at a rate of approximately ½ gallon per hour per gallon of blanching water, no off or fishy taste was imparted to potato slices treated therein at a rate of about 2 pounds per hour per gallon of blanching water (see Example 1).

It has been found experimentally that blanching water temperatures above about 160° F. or below about 145° F. are unsatisfactory for practicing the method of the invention. It is known that when potato slices are immersed in hot water both a leaching action and a cooking action occur. Presumably, the rate of each of these actions is some direct function of temperature, so that each occurs at a faster rate at a higher temperature. The leaching action may remove reducing sugars, assumed herein to be responsible for caramelization, or desirable potato constituents, or both; the cooking and the latter leaching action impair the taste of deep fat fried potato products. In this connection, we have observed that a four minute immersion, a ten minute immersion, or a twelve minute immersion of potato slices in blanching water at a temperature of about 135° F. has no appreciable effect on caramelization on subsequent deep fat frying. However, some impairment of flavor in potato chips produced from slices treated even for ten minutes in water at about 135° F. was noted. Likewise, either a 28 second immersion in blanching water at a temperature of about 190° F. or a 56 second immersion at about 175° F. has no appreciable effect on caramelization, but results in either cooking or removal of desirable substances to such extent that the flavor of the slices, after frying, is impaired.

The experimental facts set forth in the foregoing paragraph are believed to indicate that blanching water at a temperature of about 135° F. is unsatisfactory for treating potato slices according to the invention because at such temperature removal of reducing sugars is at so low a rate that either cooking or removal of desirable potato constituents, probably the latter, is the predominating action. As a consequence, it is impossible appreciably to effect caramelization by treating potatoes in water at such temperature without also producing a product that has been made less palatable by such treatment. Similarly, blanching water at a temperature of 175° F. or 190° F. is unsatisfactory because either cooking or removal of desirable potato constituents, probably the former, proceeds at so high a rate as to be the predominating action. Therefore, it is believed that when potato slices are treated in blanching water at a temperature lower than about 145° F. leaching of desirable constituents is the predominating action over cooking and leaching of reducing sugars. When potato slices are treated in blanching water at a temperature higher than about 160° F. cooking is believed to be the predominating action, over leaching either of reducing sugars or of desirable potato constituents. Accordingly, treating of potato slices by the invention to prevent caramelization upon subsequent deep fat frying without appreciable impairment of flavor must be in water at a temperature from about 145° F. to about 160° F. Also, as previously stated, fresh hot water must be admixed with the blanching water to maintain such temperature, and blanching water tailings must be withdrawn, in order to avoid an off or fishy taste.

Referring now more particularly to the drawings, a preferred embodiment of the invention is represented in Fig. 1 which shows a treating zone containing a volume of water at a temperature from about 150° F. to about 160° F., and shows the flow of potato slices to and from the treating zone, of fresh hot water to the treating zone, and of blanching water tailings from the treating zone.

It will be apparent that the rate at which undesirable constituents increase in concentration in a volume of blanching water at a given temperature depends upon the rate at which potato slices are treated in such blanching water, and the volume of blanching water employed. As a practical matter it is usually preferred that the volume of blanching water amount to at least about 1/10 gallon per pound per hour of potato slices being treated. When using such a volume of blanching water it has been found that undesirable build up of materials leached from potato slices can be avoided by mixing fresh water with the blanching water at a rate of at least about 1/10 gallon per hour per pound per hour of potato slices being treated. Preferably, the volume of blanching water is from 1/3 to 3 gallons per pound per hour of potato slices being treated, and the rate at which fresh water is admixed therewith is from 1/8 to 1 gallon per hour per pound of potato slices per hour being treated.

These relationships are all represented on Fig. 1 of the drawings, which show a blanching water temperature from about 150° F. to about 160° F., and a preferred residence time of potato slices in the treating zone of from about 2 minutes to about 3 and 1/2 minutes. Under generally these operating conditions it has been found that if the temperature of the fresh water being added to the treating zone is about 200° F. the blanching water temperature can be maintained within the desired range solely by additions of such fresh hot water, and at approximately 1/5 the rate in gallons per hour that potato slices in pounds per hour are being treated.

Referring now more particularly to Fig. 2, the relatively narrow range of blanching water temperatures, related to times of treatment, operable for treating potato slices according to the invention is represented by the shaded portion thereof. It will be noted by reference to Fig. 2 that temperatures above about 160° F., or below about 145° F. are not satisfactory for treating potatoes according to the invention, and even that temperatures between about 145° F. and about 160° F. are not suitable for such treatment unless the time of contact between the blanching water and the potato slices is controlled within the proper limits. For example, at a blanching water temperature of about 160° F. treatment according to the invention can be accomplished at contact times ranging from about 1 1/2 minutes to about 4 minutes, while at a blanching water temperature of about 150° F. contact times ranging from about 2 minutes to about 4 1/2 minutes are operable, and at blanching water temperatures of about 145° F. contact times ranging from about 5 minutes to about 8 minutes are operable. As has been discussed above, undesirable actions predominate (cooking or leaching of desirable potato constituents) when blanching water temperatures and contact times appreciably outside the range indicated in Fig. 2 are employed.

Although, as indicated in the preceding paragraph, satisfactory treatment of potato slices according to the invention can be accomplished at temperatures between about 145° F. and about 150° F., some relatively slight and usually inconsequential impairment of flavor may result in this temperature range even at the treating times indicated at Fig. 2. Accordingly, it is usually preferred that the blanching water temperature be maintained between about 150° F. and about 160° F., and that the treating time be within the range indicated for operation at such temperatures in Fig. 2. Most desirably, the blanching water temperature is from about 150° F. to about 160° F., and the contact time is from about 2 minutes to about 3 1/2 minutes. For optimum operation with most varieties of potatoes the blanching water temperature should be from about 150° F. to about 160° F., and the treating time should be from about 2 1/2 minutes to about 3 minutes. Under the most preferred and optimum operating conditions maximum leaching of reducing sugars with minimal, if any, removal of desired constituents is accomplished. No deterioration in flavor of potato chips, for example, fried from potato slices treated according to the most preferred or optimum conditions is detectable.

The precise relationships between blanching water temperature and treating time most advantageous for a particular lot of potatoes depends upon the potato variety, the type of soil in which it was grown, the length of time the particular lot of potatoes has been stored, and the storage temperatures. The precise treating conditions to be used with a given lot of potatoes should be determined in advance of treatment by running a sample therefrom at a given temperature and contact time and determining whether too much or too little leaching of reducing sugars has occurred. Suitable adjustments in contact time or blanching water temperature can then be made so that potato slices from that lot of potatoes, after deep fat frying, will have the desired color. In determining the treating time and the blanching water temperature to be used, it should be borne in mind that operation outside the ranges represented by Fig. 2 of the drawings will result in some impairment of the flavor of the potato products, as a result either of cooking or undesired leaching in the course of the treating operation. Accordingly, curing of a given lot of potatoes to lower the reducing sugar content, as hereinbefore discussed, is preferable to treating such potato slices at a temperature above about 160° F., or for a time longer, at a given temperature, than represented as satisfactory for such temperature according to Fig. 2 of the drawings.

It has been found experimentally that grease retention in, for example, potato chips produced by deep fat frying of potato slices treated according to the invention can be controlled within certain limits by varying a subsequent operation. It is customary in processing potato slices preparatory to deep fat frying to subject such slices to the action of water sprays just before introduction thereof into the fat. It has been found that by spraying relatively cold water, for example water directly from a main at a temperature of about 40° F., over potato slices treated according to the invention a treated potato slice can be produced which has minimal retention of fat after frying, for example about 33 per cent. However, if water at a temperature of about 185° F., for example, is sprayed over such treated potato slices, just prior to deep fat frying, the resulting fried product has a substantially higher residual fat content, for example in the vicinity of 36 per cent. Accordingly, a further preferred embodiment of the invention involves the spraying of water over potato slices treated according to the invention, and regulation of the temperature of the water so sprayed in order to control within desired limits the retention of fat by such slices in the course of frying.

The term "potato slices" is used herein, and in the appended claims, to include all usual forms of slices, such as those normally employed for producing potato chips, julienne potatoes, shoestring potatoes, French fried potatoes, and the like.

The following example is presented solely for the purpose of further illustrating and disclosing the method of the invention and is not in any way to be construed as a limitation thereon.

*Example 1*

Potato slices were treated to prevent caramelization upon subsequent deep fat frying according to the following procedure:

A blanching tank having a capacity of approximately 1600 gallons was provided with a substantially horizontal conveyor running generally parallel to the bottom thereof. The blanching tank was also provided with a lift conveyor for receiving potato slices at the discharge end of the generally horizontal conveyor, and for lifting them from the blanching tank. A charge of approximately 1150 gallons of water at a temperature of about 153° F. was added to the blanching tank, and a flow of fresh hot water at a temperature of about 210° F. into the tank at a rate of approximately 500 gallons per hour was started. Removal of water from the tank at a rate of approximately 500 gallons per hour was initiated. Movement of the horizontal conveyor and of the lifting conveyor were then started, and the rate of travel adjusted to provide for potato slices a residence time in the blanching tank of approximately 165 seconds. Potato slices at a rate of approximately 2300 pounds per hour were then introduced into the blanching tank, deposited upon the generally horizontal conveyor, and moved thereby through the blanching tank and onto the lifting conveyor by which they were removed from the blanching tank. Potato slices on the lifting conveyor were sprayed with water at a temperature of about 40° F., were blasted with compressed air to remove excess water, and then were directly admitted to a deep fat frying vat. Potato slices were continuously treated in this manner for approximately a 10 hour period of time, during which period the rate of flow of fresh hot water into the blanching tank was periodically adjusted to maintain the temperature of the blanching water therein at approximately 153° F., and the rate of withdrawal of tailings from the blanching tank was adjusted to maintain approximately constant the volume of water contained in the tank. Different varieties of potatoes were treated according to this method, and in every instance it was found that edible products having no "off" or undesirable taste were produced in the course of the deep fat frying operation.

For purposes of comparison, but not in accordance with the invention, samples of potato slices from various lots and varieties of potatoes were washed in cold water and then deep fat fried; in every such instance it was found that caramelization upon deep fat frying was substantially greater with potato slices washed in cold water as compared with potato slices treated with hot water according to the invention as set forth in the preceding paragraph.

It will be apparent that the invention is not limited to the specific embodiments described, and illustrated in the appended drawings, as various changes and modifications can be made without departing from the spirit of the claims.

This application is a continuation-in-part of application Serial No. 288,194, filed May 16, 1952, now abandoned.

Having described the invention, we claim:

1. A method for treating potato slices to prevent caramelization during subsequent deep fat frying that comprises passing potato slices through and from a treating zone containing hot blanching water at a temperature from about 150° F. to about 160° F. at a rate such that the time of contact between the slices and the blanching water is for from about 2½ minutes to about 3 minutes, admixing fresh hot water at a temperature at least about 200° F. with the blanching water at a rate sufficient to maintain the latter at a temperature within the indicated range, and withdrawing blanching water tailings from the treating zone at approximately the rate that fresh hot water is admixed with the blanching water therein.

2. A method for treating potato slices to prevent caramelization during subsequent deep fat frying that comprises passing potato slices through and from a treating zone containing hot blanching water at a temperature from about 150° F. to about 160° F. at a rate such that the time of contact between the slices and the blanching water is for from about 2 minutes to about 3½ minutes, admixing fresh hot water at a temperature at least about 200° F. with the blanching water at a rate sufficient to maintain the latter at a temperature within the indicated range, and withdrawing blanching water tailings from the treating zone at approximately the rate that fresh hot water is admixed with the blanching water therein.

3. A method for treating potato slices to prevent caramelization during subsequent deep fat frying that comprises passing potato slices through and from a treating zone containing hot blanching water at a temperature from about 145° F. to about 160° F., at a rate such that the time of contact between the slices and the blanching water is for from about 1½ minutes to about 8 minutes, admixing fresh hot water at a temperature substantially above 160° F. with the blanching water at a rate sufficient to maintain the latter at a temperature such that this temperature and the time of contact between the slices and the blanching water are between 1½ minutes and 4 minutes when the blanching water temperature is 160° F., between 2 minutes and 4½ minutes when the blanching water temperature is 150° F., and between 5 minutes and 8 minutes when the blanching water temperature is 145° F. and withdrawing blanching water tailings from the treating zone at approximately the rate that fresh hot water is admixed with the blanching water therein.

4. A method for treating potato slices to prevent caramelization during subsequent deep fat frying that comprises passing potato slices through and from a treating zone containing, per pound of potato slices per hour passed therethrough, at least about ⅕ gallon of hot blanching water at a temperature from about 150° F. to about 160° F., the rate of travel of slices through the treating zone being such that the time of contact between the slices and the blanching water is for from about 1½ minutes to about 4 minutes, admixing fresh water at a temperature substantially above 160° F. with the blanching water at a rate of at least about ⅛ gallon per hour per pound of potato slices per hour passed through the treating zone sufficient to maintain the latter at a temperature such that this temperature and the time of contact between the slices and the blanching water are between 1½ minutes and 4 minutes when the blanching water temperature is 160° F., between 2 minutes and 4½ minutes when the blanching water temperature is 150° F., and between 5 minutes and 8 minutes when the blanching water temperature is 145° F., and withdrawing blanching water tailings from the treating zone at approximately the rate that fresh water is admixed with the blanching water therein.

5. A method for treating potato slices to prevent caramelization during subsequent deep fat frying that comprises passing potato slices through and from a treating zone containing, per pound of potato slices per hour passed therethrough, at least about ⅒ gallon of hot blanching water at a temperature from about 145° F. to about 160° F., the rate of travel of slices through the treating zone being such that the time of contact between the slices and the blanching water is for from about 1½ minutes to about 8 minutes, admixing fresh water at a temperature of at least 160° F. with the blanching water at a rate of at least about ⅒ gallon per hour per pound of potato slices per hour passed through the treating zone sufficient to maintain the latter at a temperature such that this temperature and the time of contact between the slices and the blanching water are between 1½ and 4 minutes when the blanching water temperature is 160° F., between 2 minutes and 4½ minutes when the blanching water temperature is 150° F., and between 5 minutes and 8 minutes when the blanching water temperature is 145° F., and withdrawing blanching water tailings from the treating zone at approximately the rate that fresh water is admixed with the blanching water therein.

6. In a method for treating potato slices to prevent caramelization during subsequent deep fat frying that comprises passing potato slices through and from a treating zone containing blanching water at a predetermined temperature above room temperature, the improvement which comprises admixing fresh hot water with the blanching water at a rate sufficient to maintain the latter at the predetermined temperature, and withdrawing blanching water tailings from the treating zone at approximately the rate that fresh hot water is admixed with the blanching water therein.

References Cited in the file of this patent

UNITED STATES PATENTS

| | | |
|---|---|---|
| 1,676,160 | Ruffner | July 3, 1928 |
| 2,286,644 | Pringle et al. | June 16, 1942 |
| 2,418,519 | McBeth | Apr. 8, 1947 |
| 2,448,152 | Patton | Aug. 31, 1948 |
| 2,498,024 | Baxter | Feb. 21, 1950 |

OTHER REFERENCES

"Improvement in the Color of Potato Chips and French Fries by Certain Precooking Treatments," by T. M. Whiteman, pages 1 to 3, inclusive, reprinted from October 1951 "Potato Chipper."